(No Model.) 3 Sheets—Sheet 1.
A. V. SPANG.
CONVERTIBLE RUNNING GEAR FOR VEHICLES.
No. 605,759. Patented June 14, 1898.

(No Model.)
A. V. SPANG.
CONVERTIBLE RUNNING GEAR FOR VEHICLES.
No. 605,759. Patented June 14, 1898.
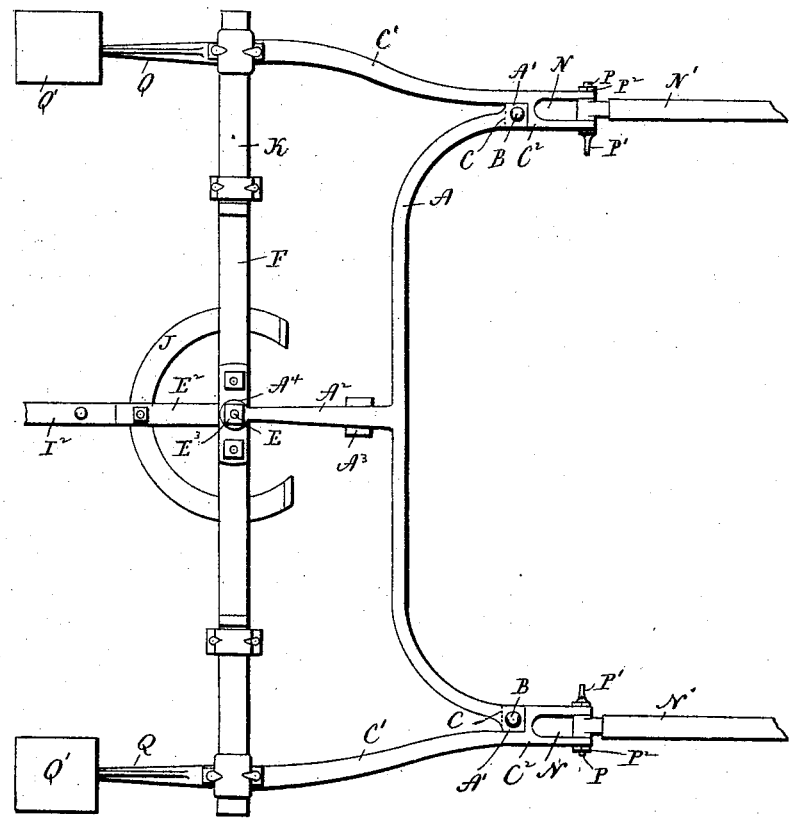
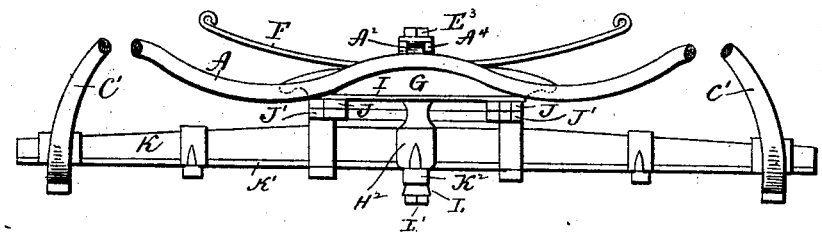

(No Model.)   A. V. SPANG.   3 Sheets—Sheet 3.
CONVERTIBLE RUNNING GEAR FOR VEHICLES.
No. 605,759.   Patented June 14, 1898.
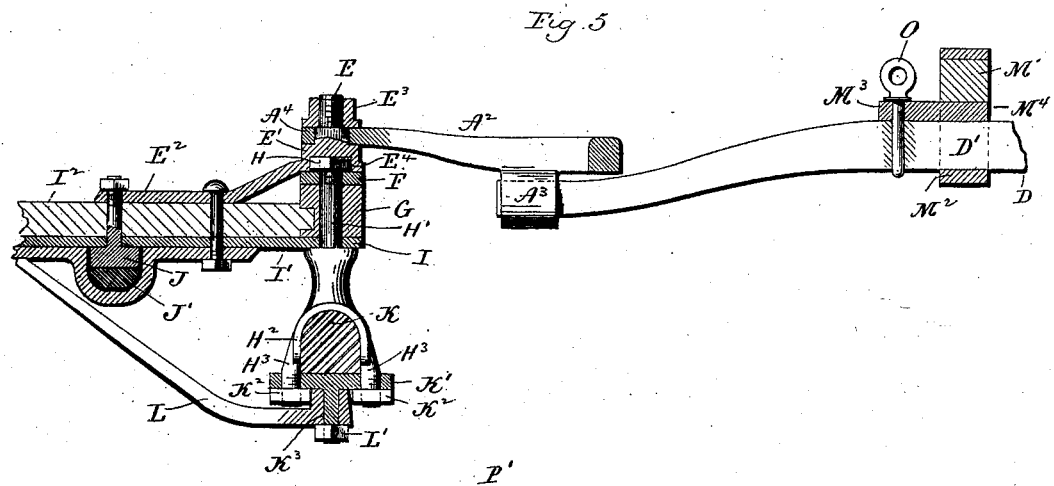
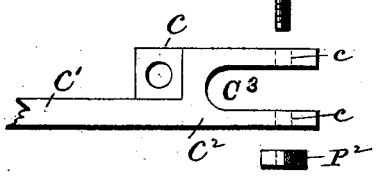
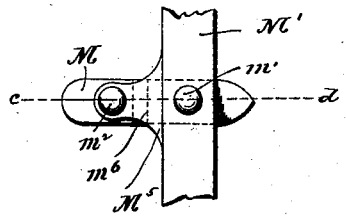
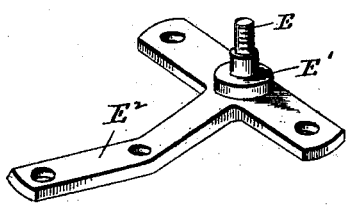
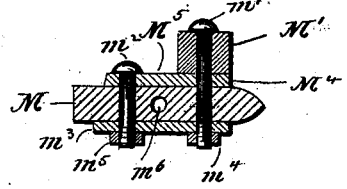

UNITED STATES PATENT OFFICE.

ANTHONY V. SPANG, OF NEW HAVEN, CONNECTICUT.

CONVERTIBLE RUNNING-GEAR FOR VEHICLES.

SPECIFICATION forming part of Letters Patent No. 605,759, dated June 14, 1898.

Application filed January 25, 1898. Serial No. 667,885. (No model.)

*To all whom it may concern:*

Be it known that I, ANTHONY V. SPANG, of New Haven, in the county of New Haven and State of Connecticut, have invented a new Improvement in Convertible Running-Gear for Vehicles; and I do hereby declare the following, when taken in connection with the accompanying drawings and the letters of reference marked thereon, to be a full, clear, and exact description of the same, and which said drawings constitute part of this specification, and represent, in—

Figure 1:
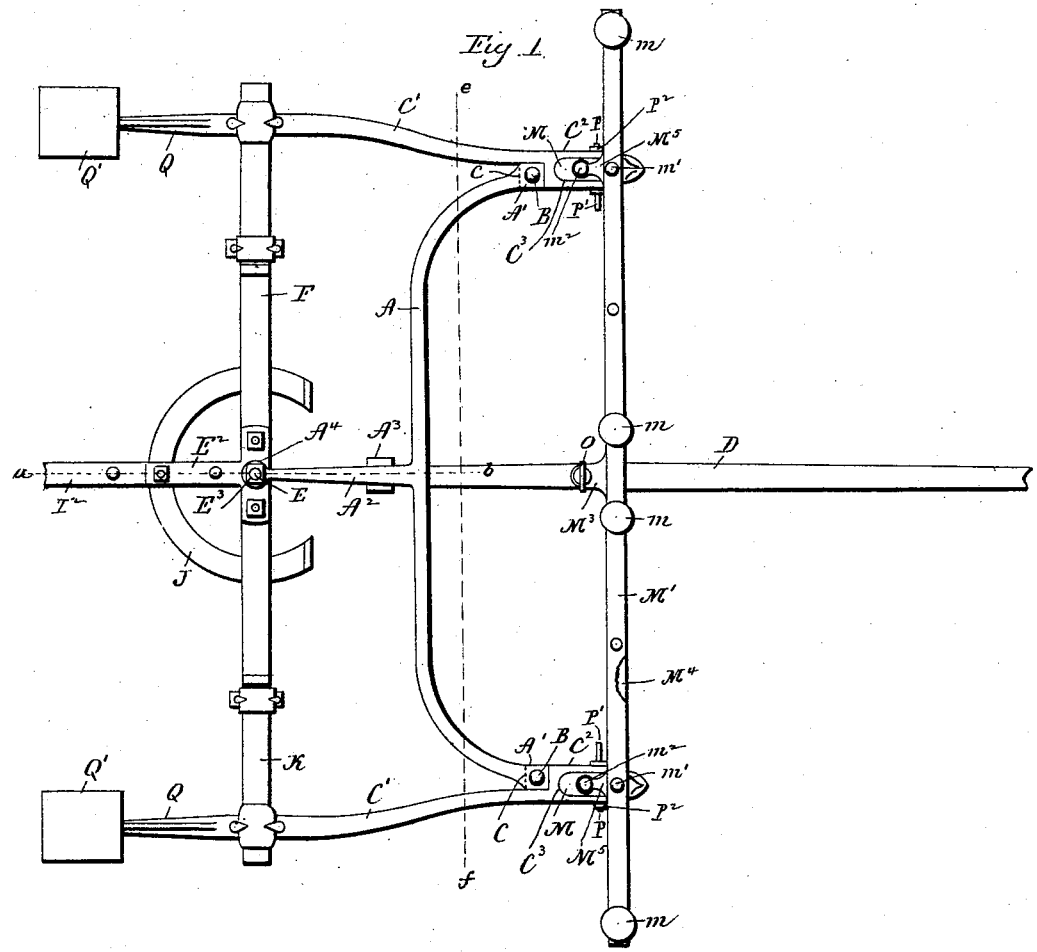
Figure 2:
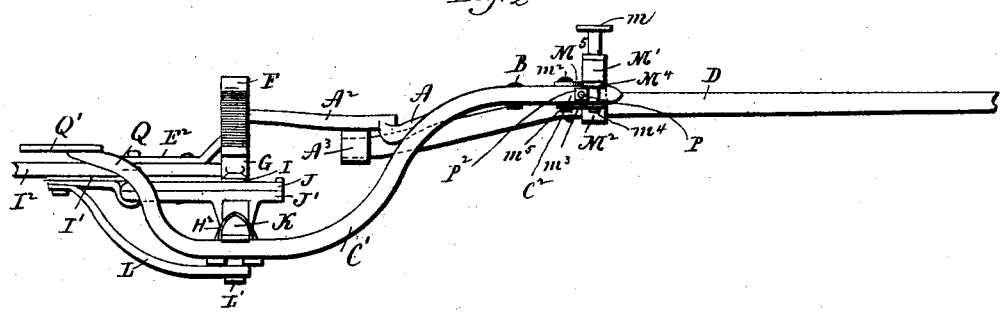

Figure 1, a plan view of a convertible running-gear constructed in accordance with my invention and shown as converted for the use of two horses; Fig. 2, a side view thereof; Fig. 3, a plan view of the gear when converted for the use of one horse; Fig. 4, a view of the gear in front elevation with the shafts removed; Fig. 5, an enlarged view, in vertical section, on the line $a\,b$ of Fig. 1; Fig. 6, a broken plan view showing the forward end of one of the fore hounds; Fig. 7, a broken plan view showing one of the coupling-blocks of the removable draw-bar; Fig. 8, a detached perspective view of the spring-plate, showing the heavy stud or auxiliary king-bolt.

My invention relates to an improvement in that type of perch running-gear for vehicles which is convertible for the attachment to it of shafts or a pole for the use of one or two horses, as desired, the object being to provide a simple and strong gear, composed of few parts, adapted to be conveniently converted for one use or the other, to dispense with the draw-bar when the pole is removed and the shafts are attached, and to provide for not only relieving the king-bolt from strain, but also for assisting in the support of the same.

With these ends in view my invention consists in certain details of construction and combinations of parts, as will be hereinafter described, and pointed out in the claims.

In carrying out my invention I employ a yoke A, which may be said to be transversely arranged with respect to the gear, the two members of the yoke being bent downward midway of their length for clearance and then bent forward at their ends, which terminate in small heads A' A', which are perforated for the reception of bolts B B, by means of which the said members of the yoke are permanently connected with lugs C C, formed upon the inner faces of the forward ends of the fore hounds C' C', the rear ends of which are connected with the fore axle K in any approved manner. If desired, however, I may make the yoke A' integral with the fore hounds C' C' instead of bolting its members thereto, as herein shown and described. The said yoke is formed with an integral rearwardly-extending centrally-arranged combined supporting and draft arm $A^2$, provided at its forward end with a depending pole-socket $A^3$ for the reception of the extreme rear end of the pole D and forming the rear pole-socket. At the extreme rear end the said arm $A^2$ is provided with a horizontally-arranged eye $A^4$, adapting the said yoke-arm, and hence the yoke, to be connected with a heavy threaded stud E, formed integral with and projecting above a boss E', corresponding in external diameter to the diameter of the eye $A^4$ just mentioned and formed upon the center of the upper face of the forward end of the spring-plate $E^2$, by means of which the spring F is secured to the head-block G. A nut $E^3$, applied to the projecting upper end of the said stud E, holds the eye $A^4$ of the arm $A^2$ in place down upon the boss E' aforesaid. I may here mention that the middle portions of the two members of the yoke A are bent downward, as shown in Fig. 4, so that the ends of the spring F may clear the yoke when the vehicle is being turned. At a point directly below the boss E' of the spring-plate $E^2$ the same is formed with a recess $E^4$ for the reception of the nut H, which is applied to the threaded upper end of the king-bolt H', which projects upward through the spring F, head-block G, and through the head-block plate I, upon which the head-block rests. The said head-block plate I is located at the forward end of and constitutes an integral lateral extension of the perch-plate I', which is secured to the lower face of the perch $I^2$, the forward end of the perch being mortised in the usual manner into the center of the rear face of the head-block G. The upper and lower segments J and J' of the fifth-wheel are constructed and secured in place in any approved manner.

Although I have spoken of the part E as a "stud," I might with propriety characterize it as an "auxiliary king-bolt," for it does supplement the action of the king-bolt in taking the draft imposed upon the gear, and its position and construction enable it to be made heavier than it is feasible to make the king-bolt in most instances. The king-bolt H is formed in the usual manner at the upper end of an axle-yoke H², the threaded arms H³ H³ of which embrace the fore axle K and are connected at a point beneath the same by a yoke-plate K', secured in place by nuts K² and formed with a centrally-arranged depending threaded bolt K³, with which the forward end of the perch-brace L is connected by means of a nut L'.

It will be seen from the foregoing that the transversely-arranged yoke A, which is permanently connected with the fixture and which constitutes one of the main features of my present invention, is connected with the running-gear by means of a heavy stud located in line with but directly above the king-bolt. None of the strain and draft imposed upon the yoke A therefore falls upon the king-bolt, but, on the other hand, the same is somewhat relieved of strain, as the said yoke is connected with the perch I² through the spring-plate E². Furthermore, by connecting the arm A² of the yoke A with the running-gear at a point above the king-bolt instead of at a point below it I secure a stronger construction and a better general distribution of strain.

The forward ends of the fore hounds C' are constructed with coupling-heads C², having deep forwardly-opening coupling-slots C³, adapted to receive the coupling-blocks M of the removable draw-bar M' or the coupling ends N of the removable shafts N', according as the fixture is converted for the use of one or two horses. The said draw-bar M' is provided midway of its length with a depending rectangular loop M², adapted to receive the squared portion D' of the pole D, which is enlarged and squared at the point of its passage through the loop M², so as to prevent it from turning on its longitudinal axis, the said loop forming the forward pole-socket and coacting with the rear pole-socket A³, already described, in supporting the pole D. A rearwardly-projecting centrally-arranged lug M³, formed integral with the draw-bar plate M⁴, which extends throughout the length of the draw-bar M', and located direct above the forward pole-socket M², is provided for the reception of a coupling-pin O, which extends downward through the pole D for holding it against endwise movement. The said draw-bar M' is also furnished with trace-buttons m, which may be replaced by any equivalent trace-holding instrumentalities. The coupling-blocks M of the removable draw-bar are rounded at their rear ends to conform to the shape of the rear ends of the coupling-slots C³ in the coupling-heads C² of the fore hounds, while the forward ends of the said blocks are shaped to give them an ornamental appearance. The said blocks are firmly secured to the draw-bar M' by bolts m' m², the bolts m' extending downward through the draw-bar, through the draw-bar plate M⁴, through the forward ends of the coupling-blocks, and through the forward ends of small coupling-block plates m³ applied to the lower faces of the blocks. The projecting lower ends of the said bolts m' receive nuts m⁴, as shown. The bolts m² pass downward through lugs M⁵, formed integral with and extending rearwardly from the draw-bar plate M⁴, through the rear ends of the coupling-blocks M, through the rear ends of the coupling-block plates m³, and receive at their threaded lower ends nuts m⁵. The said blocks M' are formed with transversely-arranged cockeye-bolt openings M⁶, which receive cockeye-bolts P, having their inner ends formed with eyes P', with which the traces are connected when the fixture is converted for one horse, the said cockeye-bolts passing outwardly through cockeye-bolt holes c c, formed in the arms of the coupling-heads C², and having nuts P² applied to their threaded outer ends.

When it is desired to convert the fixture for the use of one horse instead of two, the coupling-pin O is removed and the pole D drawn forward out of the sockets A³ and M². The cockeye-bolts P are then taken out and the removable draw-bar M' detached altogether from the fixture. The coupling ends N of the shafts N' are then inserted into the coupling-slots C³ of the coupling-heads C² of the fore hounds C'. The cockeye-bolts P are then returned to place, passing through the said coupling ends of the shafts and through the coupling-heads of the fore hounds, the eyes P' of the bolts serving for the attachment of the traces. Here I wish to call particular attention to the fact that inasmuch as the draw-bar M' is now removed and inasmuch as the yoke A lies considerably back of the forward ends of the fore hounds the horse may be hitched much closer to the running-gear than is possible in convertible fixtures as ordinarily made. This is particularly advantageous in the use of small carriages, where it is better to have the horse hitched as close to the running-gear as possible for ease of draft. I may call attention to the fact that the fore hounds C' are extended at their rear ends to form step-supports Q, which terminate in steps Q'.

It will be seen from the foregoing description that by constructing and arranging the yoke A and its rearwardly-extending arm A² for the attachment of the latter to a heavy stud or auxiliary king-bolt located above and in line with the king-bolt proper I secure a very simple and convenient construction in which the drafts are disposed to the best advantage and the whole forward part of the running-gear reinforced. It will also be seen that by constructing and arranging the yoke A in the manner shown and described it stiffens and supports the fore hounds so perfectly that it is not necessary to use a draw-bar of any description when the gear is converted for the use of one horse, at which time the removable draw-bar used for two horses is dispensed with and the single horse hitched well to the rear, which is permitted by the form and location of the yoke. These advantages are too patent to need further mention.

It is apparent that in carrying out my invention some changes from the construction herein shown and described may be made. I would therefore have it understood that I do not limit myself to the exact construction herein shown, but hold myself at liberty to make such changes and alterations as fairly fall within the spirit and scope of my invention.

Having fully described my invention, what I claim as new, and desire to secure by Letters Patent, is—

1. In a convertible running-gear for vehicles, the combination with two fore hounds extending forward from the fore axle, and adapted to have a draw-bar or shafts interchangeably connected with their forward ends, of a yoke permanently connected with the hounds, and formed with a rearwardly-extending combined supporting and draft arm connected at its rear end with the running-gear at a point above the head-block thereof.

2. In a convertible running-gear for vehicles, the combination with two hounds extending forward from the fore axle and adapted at their forward ends to have shafts or a draw-bar interchangeably connected with them, and a yoke connected with the said hounds, and also connected with a stud located above and in line with the king-bolt of the gear.

3. In a convertible perch running-gear for vehicles, the combination with the head-block thereof, of a spring mounted thereupon, a spring-plate attached at its rear end to the perch, and at its forward end resting upon the said spring, and secured to the said head-block, and provided with an upwardly-extending stud and with a recess located below the same, a king-bolt extending upward through the said head-block and into the said recess which receives the nut applied to the upper end of the said king-bolt which is located below and in line with said stud, a yoke adapted at its rear end to be directly connected with the said stud, and fore hounds having the forward ends of the yoke connected with them, and being themselves adapted to interchangeably receive shafts or a draw-bar.

4. In a convertible running-gear for vehicles, the combination with the fore axle, the head-block and the king-bolt thereof, of fore hounds connected at their rear ends with the fore axle, and having their forward ends adapted for interchangeable connection with them, of shafts or a draw-bar, and a yoke having its members bent downwardly and forwardly, and connected at their ends with the said hounds, the said yoke being provided with a rearwardly-extending, centrally-arranged arm adapted to be connected with the gear at a point above the head-block and over the king-bolt.

5. In a convertible running-gear for vehicles, the combination with the head-block thereof, of a spring-plate connected with the said head-block, provided with an upwardly-projecting stud, and formed with a recess located below the same, a yoke having a rearwardly-extending arm adapted to be connected directly with the said head, and with two forwardly-extending members, and fore hounds having the forwardly-extending members of the yoke connected with them, and connected at their rear ends with the fore axle of the gear.

6. In a running-gear for vehicles, the combination with a plate adapted to be attached at its rear end to the perch and at its forward end to rest upon the head-block spring, and provided with an upwardly-extending stud or auxiliary king-bolt and formed with a recess located below the said stud and receiving the upper end of the king-bolt and the nut applied thereto, the said stud or auxiliary king-bolt being adapted to take a portion of the draft or strain imposed upon the running-gear.

In testimony whereof I have signed this specification in the presence of two subscribing witnesses.

ANTHONY V. SPANG.

Witnesses:
 FRED. C. EARLE,
 GEORGE D. SEYMOUR.